(12) United States Patent
Schmit et al.

(10) Patent No.: US 7,671,920 B2
(45) Date of Patent: Mar. 2, 2010

(54) CAMERA BODY OF A VIDEO SYSTEM WITH A HANDGRIP AND VIDEO SYSTEM

(75) Inventors: Erwin Schmit, The Hague (NL); Milan Duchenne, Rotterdam (NL); Noortje Bos, Eindhoven (NL)

(73) Assignee: Thomson Licensing, Boulogne-Billancourt (FR)

( * ) Notice: Subject to any disclaimer, the term of this patent is extended or adjusted under 35 U.S.C. 154(b) by 444 days.

(21) Appl. No.: 11/516,349

(22) Filed: Sep. 6, 2006

(65) Prior Publication Data

US 2007/0077035 A1  Apr. 5, 2007

(30) Foreign Application Priority Data

Sep. 7, 2005  (EP) .................... 05300722

(51) Int. Cl.
*H04N 5/225* (2006.01)
(52) U.S. Cl. ............... 348/373; 348/376; 348/374; 348/375; 396/535; 396/652
(58) Field of Classification Search ........... 348/373, 348/374, 375, 376, 81; 386/118; D16/206, D16/243; 396/347, 535, 652
See application file for complete search history.

(56) References Cited

U.S. PATENT DOCUMENTS

| 4,959,729 | A  | * | 9/1990  | Fukuda et al. ............. 348/375 |
| 5,157,512 | A  | * | 10/1992 | Inada et al. ................ 386/118 |
| 5,177,517 | A  | * | 1/1993  | Schappler et al. ........... 396/424 |
| 5,294,988 | A  |   | 3/1994  | Wakabayashi et al. |
| 5,960,156 | A  | * | 9/1999  | Nishiyama et al. .......... 386/118 |
| 7,409,148 | B2 | * | 8/2008  | Takahashi et al. ............ 396/29 |
| 2002/0130963 | A1 | * | 9/2002 | Gelbard ..................... 348/360 |
| 2005/0024526 | A1 | * | 2/2005 | Wang ........................ 348/373 |
| 2005/0190683 | A1 | * | 9/2005 | Ando ........................ 369/121 |
| 2007/0058075 | A1 | * | 3/2007 | DeSorbo ..................... 348/373 |
| 2007/0229694 | A1 | * | 10/2007 | Oshima et al. ......... 348/333.06 |
| 2009/0059064 | A1 | * | 3/2009 | Terakado .................... 348/376 |

OTHER PUBLICATIONS

Patent Abstracts of Japan vol. 008 No. 155 (E-256) Jul. 19, 1984 & JP 59 057580 A (Konishiroku Shashin Kogyo KK), Apr. 3, 1984 *abstract*, Search Report dated Dec. 12, 2005.

* cited by examiner

*Primary Examiner*—Tuan Ho
*Assistant Examiner*—Marly Camargo
(74) *Attorney, Agent, or Firm*—Robert D. Shedd; Robert B. Levy; Jorge Tony Villabon

(57) ABSTRACT

A camera body of a video system has a housing which is comprised of cover elements. Two of the cover elements which, in an area of the handgrip, are fitted together and which shape a part of the housing, also shape the handgrip of the housing.

3 Claims, 1 Drawing Sheet

CAMERA BODY OF A VIDEO SYSTEM WITH A HANDGRIP AND VIDEO SYSTEM

This application claims the benefit, under 35 U.S.C. §119 of European Patent Application 05300722.5, filed Sep. 7, 2005.

BACKGROUND OF THE INVENTION

1. Field of the Invention

The present invention is related to a camera body of a video system with a handgrip, and a corresponding video system. Video systems such as a video camera or a camcorder with a camera and a recorder, use camera bodies with at least one handgrip on the top or at one side of the camera body.

2. Description of the Prior Art

A video system known by the applicant, in particular a professional camcorder, has a camera body with a housing, in which a camera and a recorder are integrated, and components, such as an optical system, e.g. a lens unit and an electronic view finder. Other possible components are a screen, e.g. a rotative LCD (liquid crystal display) screen, and a light module, e.g. a lamp. The housing comprises cover elements, namely a bottom cover, a top cover, two side covers, a front cover and a rear cover.

The camera body of the known professional camcorder also includes a handgrip, which is a separate element attached to the top cover. As an attachment, the handgrip has sockets at each end and is fixed by screws. The screws extend through the ends of the handgrip, through the sockets and into the top cover. Such a handgrip requires an excessive amount of work to be manufactured and then assembled to the housing. In addition, some of such handgrips are uncomfortable to use or are aesthetically unappealing to look at.

It is therefore desirable to develop a camera body of a video system with a handgrip, which requires less effort to be manufactured and assembled to the housing of the camera body. The handgrip should also be comfortable to use and aesthetically appealing to look at.

SUMMARY OF THE INVENTION

According to the invention, two of the cover elements which, in an area of the handgrip, fit together and shape one part of the housing, also shape the handgrip. Particularly, the two cover elements fit together to shape the part of the housing and also fit together to shape the handgrip. Thus, the handgrip is integrated into the cover elements as well as in the housing of the camera body.

As a result, the handgrip is manufactured simultaneously with the two cover elements. Additionally, the handgrip is automatically created when the two cover elements are fitted together and the part of the housing is made up.

Through the integration of the handgrip into the cover elements, fewer elements need to be manufactured. A separate attachment for the handgrip is no longer necessary. As a result, the manufacturing costs and the assembly time are reduced. The fixation of the handgrip to the housing is much stronger than a fixation with screws, which can come loose.

The part of the housing, on which the handgrip is positioned, can be a side cover and/or a top cover. The preferable position for the handgrip of a professional camcorder is on the top with the two cover elements shaping the top cover of the housing.

Each of the two cover elements can comprise a cover section and a grip section in a way, that the cover sections of the two cover elements shape the part of the housing while the grip sections shape the handgrip.

The grip sections can have the form of a bar, which flows into the cover sections, at each end. The handgrip shaped by the grip sections can stand away from the housing. Alternatively, the part of housing shaped by the cover sections can have the form of a hollow under the handgrip.

The inventive features provide a lot of freedom in defining the shape of the handgrip. Both ergonomic and aesthetic aspects can be taken into account.

Both of the grip sections of the two cover elements can create at least one hollow space. For that to happen, the grip sections can have the form of a long dish or a groove. Such hollow spaces provide room for components and further devices, such as electronics.

At least one of the hollow spaced can lead to an outer opening in the grip sections, which connects the hollow space with the surroundings of the housing. Such hollow spaces provide room for further components, such as an electronic view finder, or for electrical connections, such as for jacks for an USB (universal serial bus) or a FireWire connection.

At least one of the hollow spaces can lead to an inner opening in the cover sections, which connects the hollow space with an inner space in the housing. This enables a connection of the components and/or the devices arranged in the hollow space with the components and/or the devices in the inner space of the housing.

The inner opening is therefore located in a part of the housing shaped by the cover sections. The inner opening should be covered by the grip sections.

In addition to shaping a top cover and the handgrip, the two cover elements preferably shape two side covers of the housing. For that to happen, each of the two cover elements comprises a side cover section, a top cover section, as the cover section, and a grip section. The number of elements, which need to be manufactured and assembled, is further minimised.

BRIEF DESCRIPTION OF THE DRAWINGS

The invention will be explained in further detail using one embodiment, which is illustrated in the figures.

It shows.

DETAILED DESCRIPTION OF AN EMBODIMENT OF THE INVENTION

Figure 2:
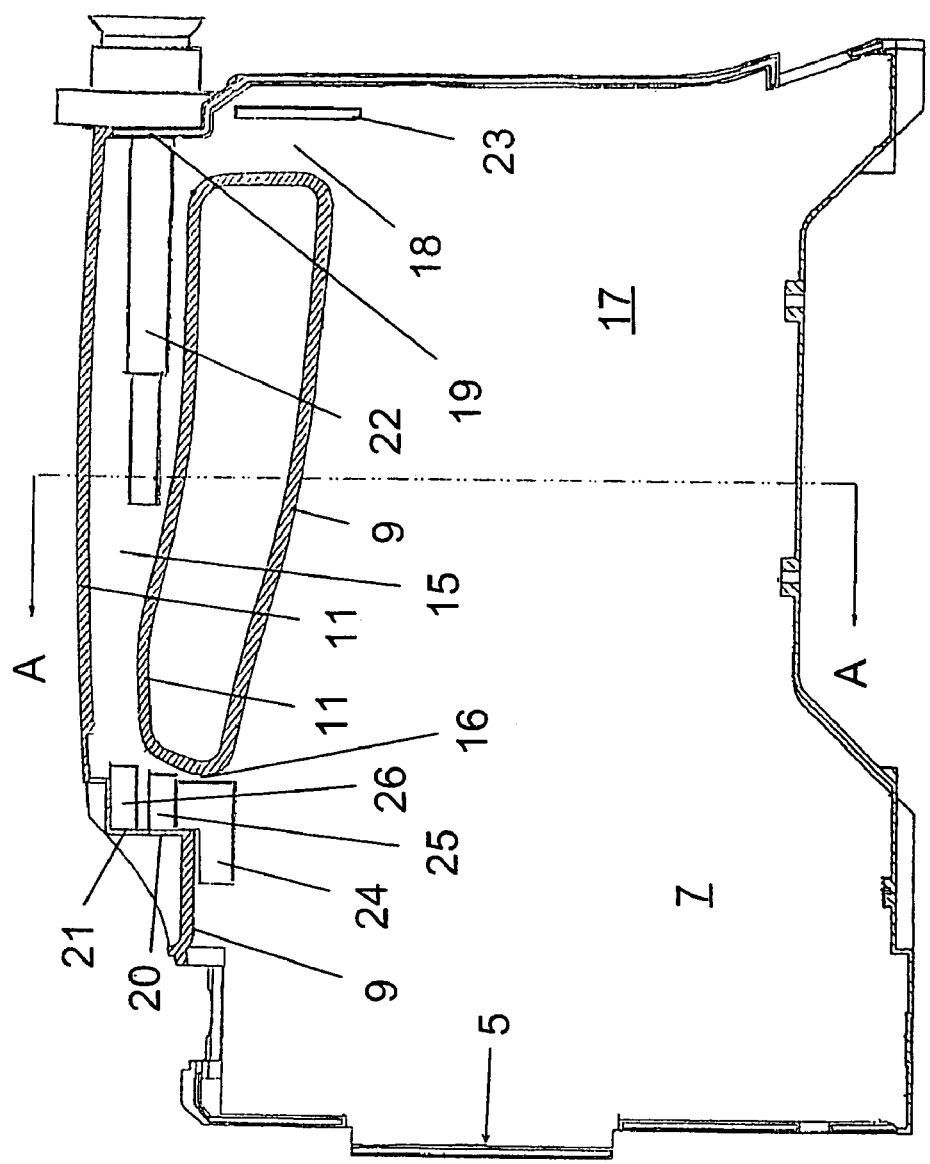
Figure 1:
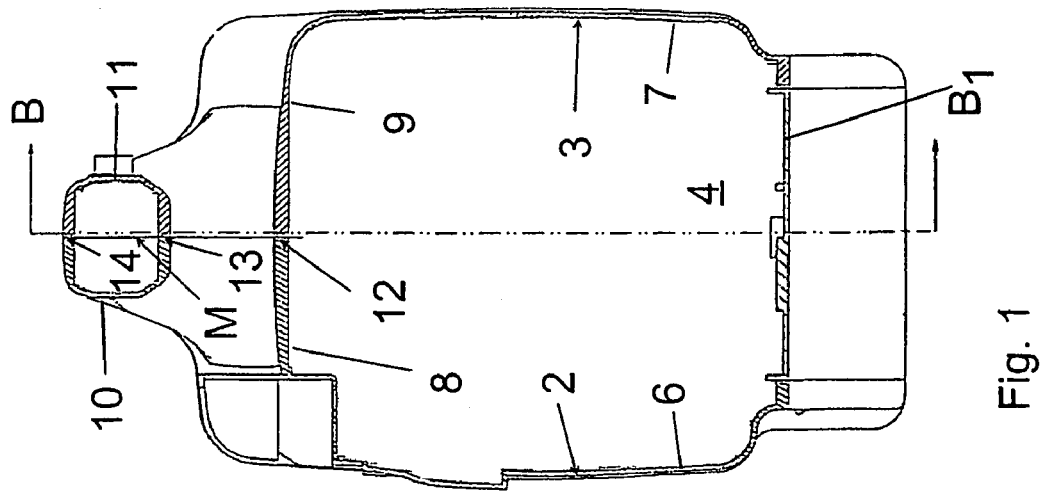
FIG. 1 a schematic cross-section A-A of a housing of a camera body of the embodiment and FIG. 2 a schematic longitudinal section B-B of the housing shown in FIG. 1.

A camera body of an embodiment of the invention has a housing, of which a cross-section is shown in FIG. 1 and which comprises the following cover elements: a bottom cover 1, two cover elements, one left cover element 2 and one right cover element 3, a front cover, which can not be seen in FIG. 1, and a rear cover 4. The cover elements 2, 3 are indicated by arrows. The determination of the directions, such as front and rear and also right and left corresponds to the view of the FIG. 1. Therefore, a lens unit, shown by an arrow 5 in FIG. 2, is arranged in the rear of the housing.

Each of the cover elements 2, 3 comprises a side cover section 6, 7, a top cover section 8, 9 and a grip section 10, 11.

FIG. 1 shows, that the side cover sections 6, 7 of the cover elements 2, 3 fit to the bottom cover 1. The side cover section 6 of the left cover element 2 shapes the left side of the housing, while the side cover section 7 of the right cover element 3 shapes the right side of the housing. The cover elements 2, 3 are fitted to each other in a way, that both top cover sections 8 and 9 of the two cover elements 2, 3 shape the top of the housing, while both grip sections 10, 11 of the two cover elements 2, 3 shape the handgrip.

One of the fittings is the fitting of its top cover section 8, 9 along a first connection line, see arrow 12. Two other fittings are the fittings of its grip sections 10, 11 along a second, lower connection line, see arrow 13 and along a third, upper connection line, see arrow 14. All connection lines pass in the vertical middle plane of the handgrip, see arrow M. The three connection lines and the middle plane extend lengthwise with reference to the handgrip. All connection lines extend parallel to one another.

Alternatively, one or more connection lines can pass beside the vertical middle plane of the handgrip. All connections lines need to pass through the area of the handgrip. They need not to be parallel to one another.

The shape of the two cover elements 2, 3, i.e. the shape of its corresponding sections 6 and 7, 8 and 9, as well as 10 and 11 is similar. The shape of the cover elements 2, 3 will be described with the help of the right cover element 3 shown in FIG. 2. FIG. 2 is a longitudinal section B-B of the housing, taken nearly one mm beside the vertical middle plane of the handgrip. FIG. 2 shows in particular a longitudinal section of the right cover element 3.

By shaping the right side of the housing the side cover section 7 of the right cover element 3 extends in a vertical direction. At its upper edge it turns to the top cover section 9. Both sections 7, 9 nearly form a right angle.

The top cover section 9 nearly extends in a horizontal direction and fits at the first connection line to the top cover section 8 of the left cover element 2.

The grip section 11 of the right cover element 3 has, at least in its middle, the shape of a groove or a long dish. The groove is arranged in a way, that its hollow, i. g. the hollow of grip section 11, is facing a corresponding hollow of the grip section 10 of the left cover element 2. The two hollows of the grooves form a common longitudinal hollow space 15 in the handgrip. The two grooves of the grip sections 10, 11 fit together along the lower and the upper connection lines, see arrows 13, 14 shaping the handgrip and its hollow space 15. In this embodiment with a handgrip on the top of the housing shaped by the cover elements, the widths of the grooves are arranged vertically.

The grip section 11 of the right cover element 3 is curved at the rear end, i.e. at the left side of FIG. 2, to the top cover section 9. The top cover section 9 has an opening in this area. The opening faces a corresponding opening of the top cover section 8 of the left cover element 2. The two openings form a common inner opening 16 in the top of the housing, which connects the hollow space 15 of the handgrip with the inner space 17 of the housing. This inner opening 16 is covered by the grip sections 10, 11.

The grip section 11 of the right cover element 3 is curved at its front end, i. e. at the right side of FIG. 2, in a similar way to the top section 9. A further inner opening 18 in the cover sections 8, 9, which connects the hollow space 15 of the handgrip with an inner space 17 of the housing, is provided. FIG. 2 shows, that the front end of the handgrip connects the top of the housing very close to the front of the housing. In this embodiment, a part of the grip sections 10, 11 turns into the top cover sections 8, 9 while another part might turn into the side cover sections 6, 7.

The grip section 11, of the right cover element 3 creates outer openings at its front end and at its rear end. Each of these openings faces a corresponding opening of the grip cover section 10 of the left cover element 2. Each pair of corresponding openings forms a common outer opening 19, 20, 21, which connect the hollow space 15 of the handgrip with the surrounding.

The grip sections 10, 11 can be widened at its ends. As a result, the handgrip as well as its hollow space 15 are widened in this area.

An electronic view finder 22 is arranged in the front part of the hollow space 15 of the handgrip. The view finder 22 extends horizontally and passes through the outer opening 19. The arrangement of view finder 22 in the handgrip enables a very stable fixation of the view finder 22.

Electronic devices 23, 24, such as PCBs (printed circuit boards), are positioned in the area of the inner opening 18 and in the area of the inner opening 16.

Further electronic devices 25, 26, such as jacks for an USB connection and for a FireWire connection, are arranged in the hollow space 15 of the handgrip in front of the outer openings 20, 21.

The view finder 22 can be connected with the devices 23 in the inner opening 18, the devices 25, 26 can be connected with the devices 24 in the inner opening 16, as well as all of the components and devices 22, 23, 24, 25, 26 can be connected with devices in the inner space 17 of the housing, not shown in FIG. 2.

Alternatively, the grip sections 10, 11 can create numerous hollow spaces in the handgrip.

The invention claimed is:

1. A camera body of a video system with a housing comprising:
    at least two cover elements; and
    a handgrip, wherein the handgrip is formed on a top of the housing, standing away from the housing and having the form of a bar; wherein
    the at least two cover elements, which, in an area of the handgrip, are fitted together and shape a part of the housing, also shape the handgrip;
    said at least two cover elements include a cover section and two grip sections such that the cover sections are fitted together and shape said part of the housing and the grip sections are fitted together and shape the handgrip, said at least two cover sections also include a side cover section and a top cover section, each of the side cover sections shaping one of two sides of the housing, the top cover sections being fitted together and shaping the top of the housing,
    the grip sections creating in the hand at least one hollow space, which leads to first and second inner openings in the cover sections,
    the first and second inner openings connecting the at least one hollow space with an inner space of the housing, and
    wherein first electronic devices are positioned in the area of the first and second inner openings and second electronic devices are arranged in the hollow space of the handgrip in front of outer openings.

2. The camera body according to claim 1, wherein at least one of the hollow spaces leads to at least one outer opening in the grip sections and that the outer opening connects the hollow space of the handgrip with surroundings of the housing.

3. A video system comprising a camera body according to claim 1.

* * * * *